March 31, 1931. A. KAYSER 1,798,980
WINDING MACHINE FOR DYNAMO ELECTRIC MACHINES
Filed Aug. 16, 1929 6 Sheets-Sheet 5
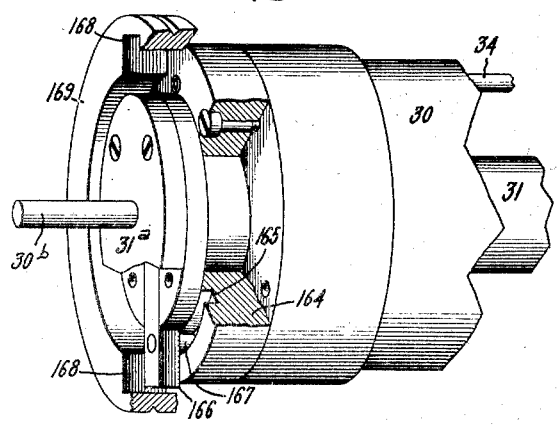
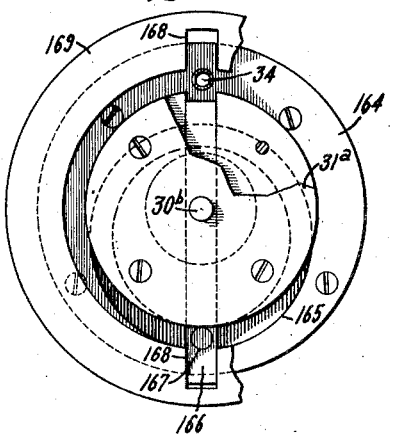
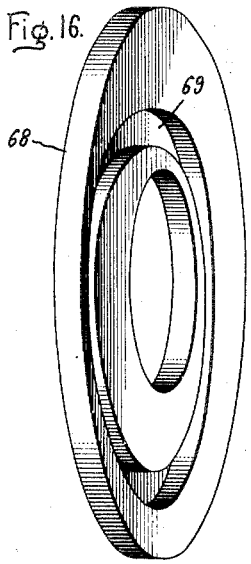
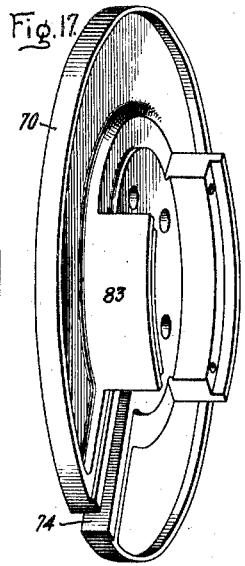
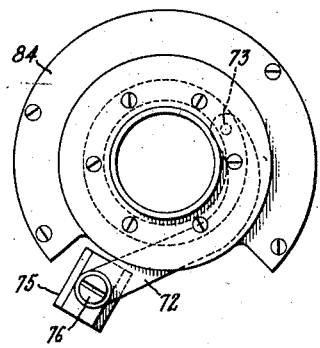
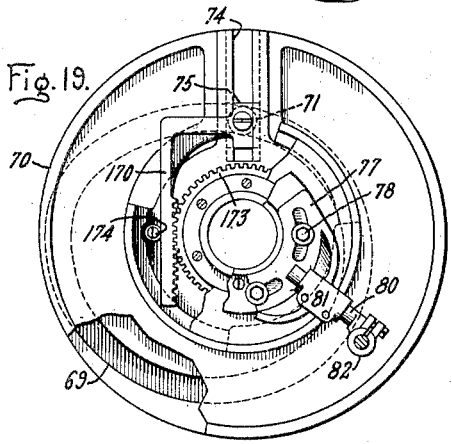
Inventor:
August Kayser
by Charles E. Tullar
His Attorney.

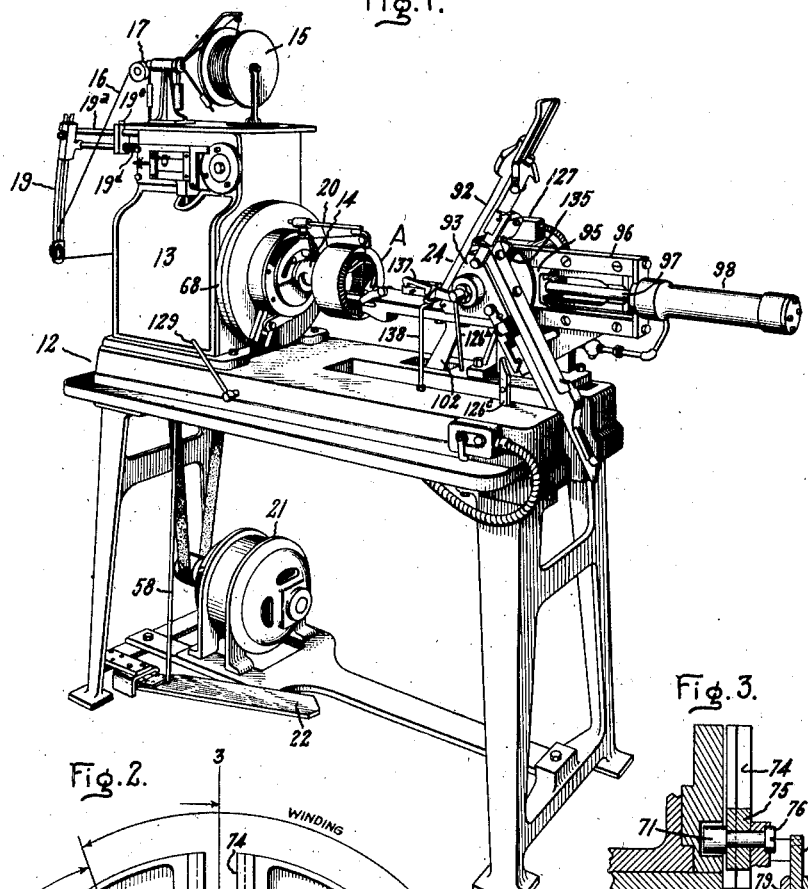

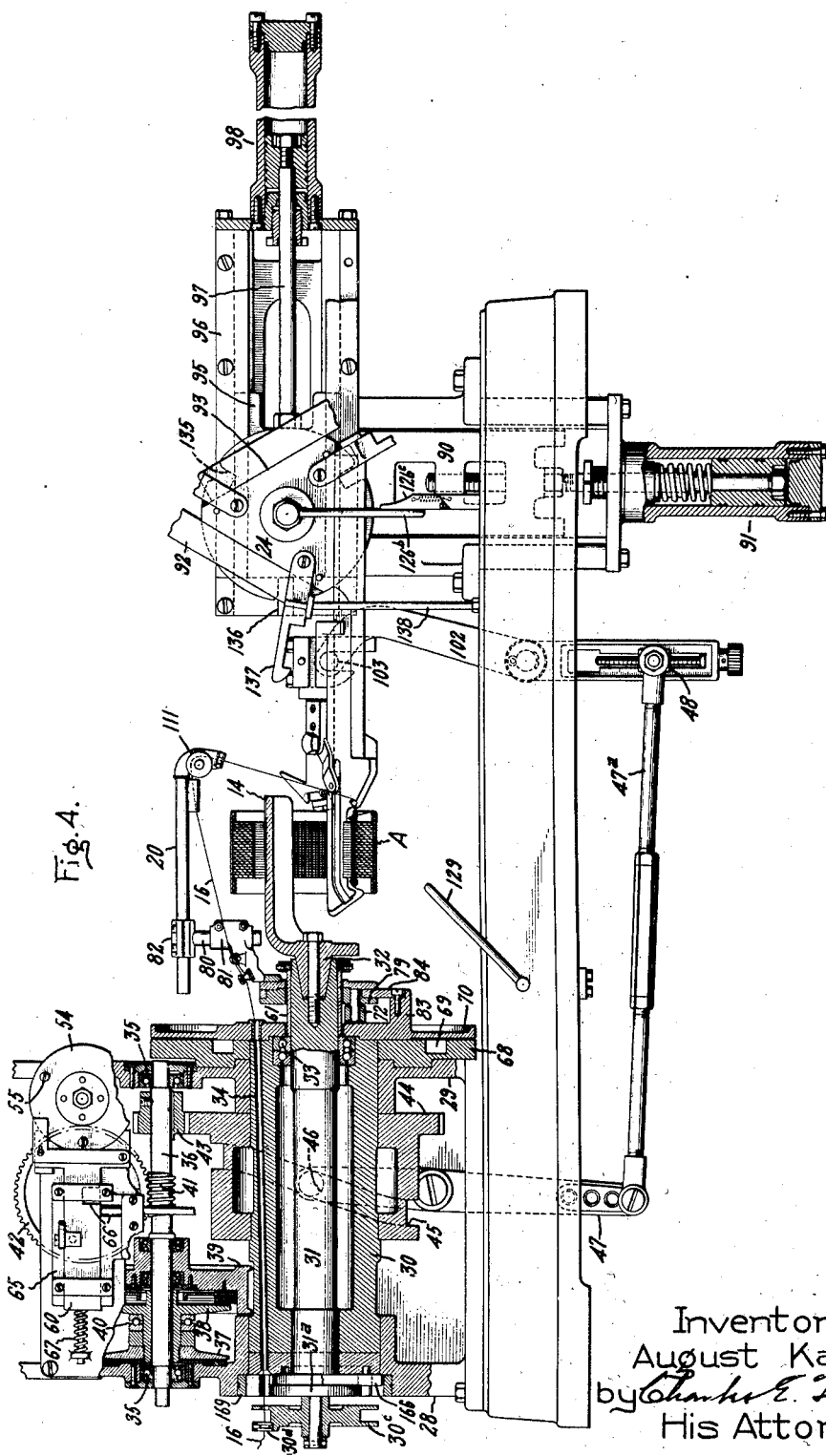

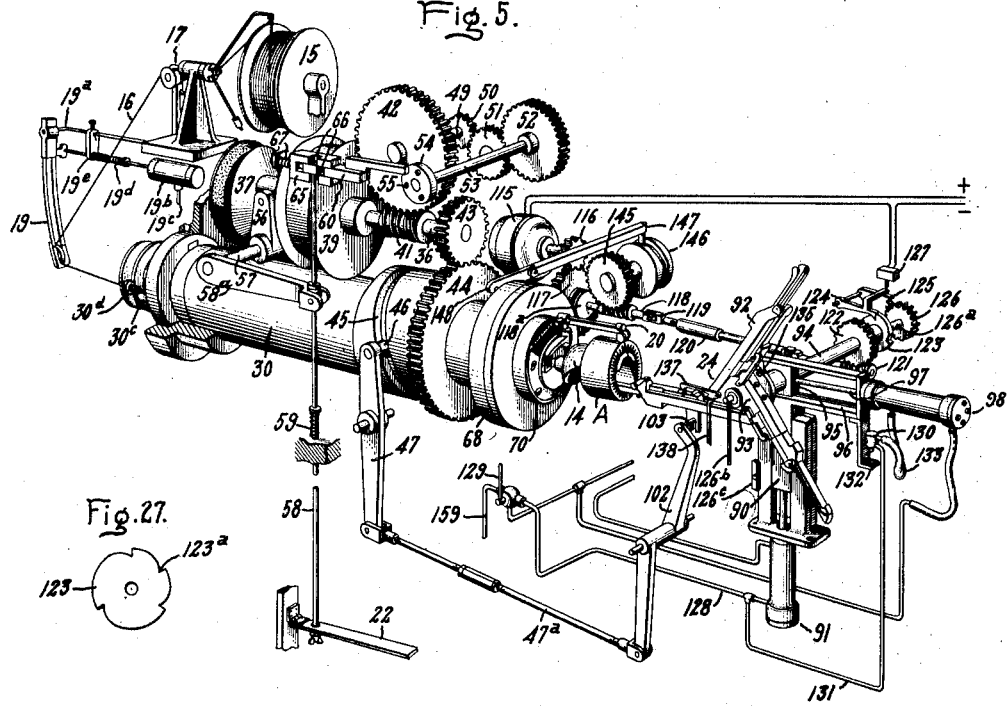
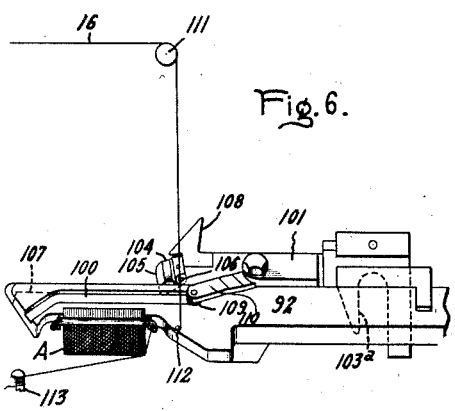
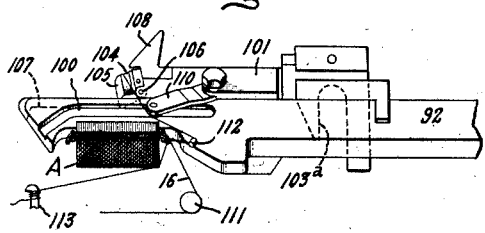
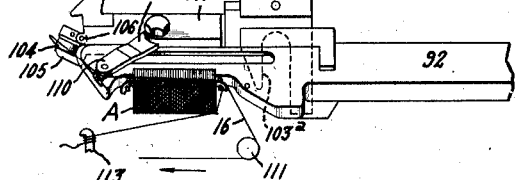
Inventor
August Kayser,
by Charles E. Tullar
His Attorney.

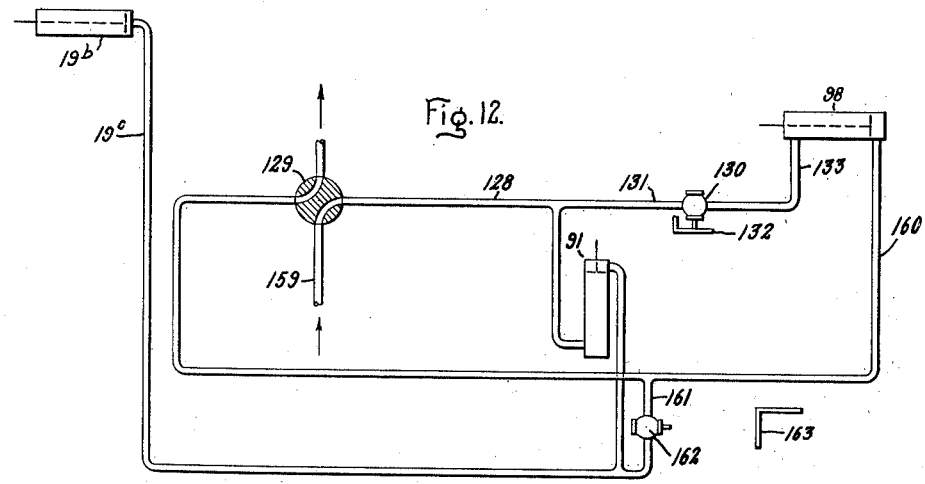
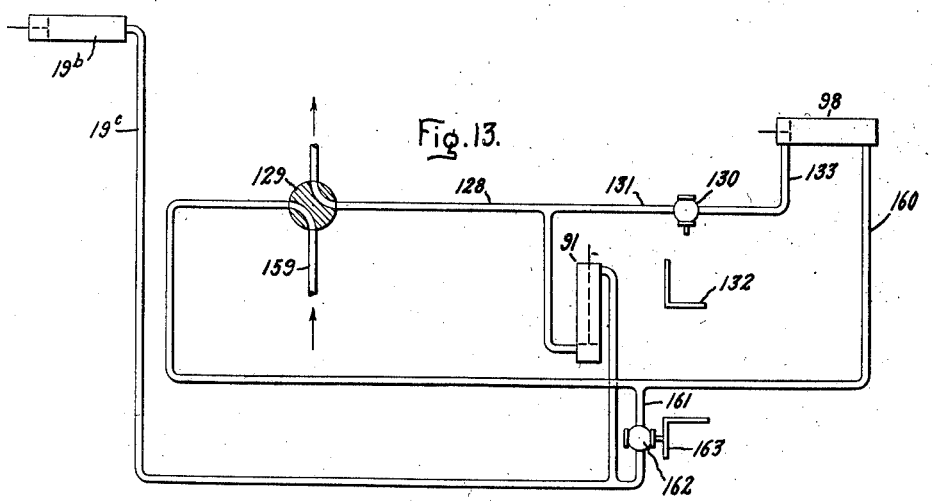
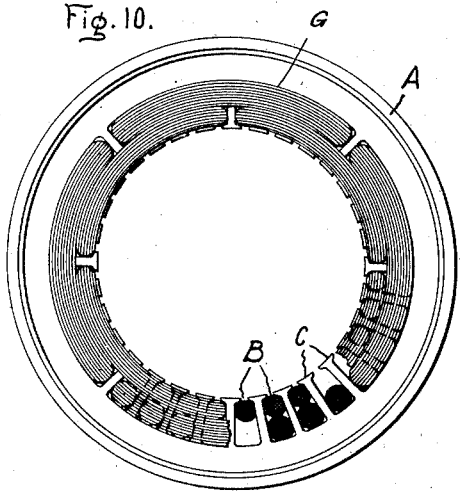
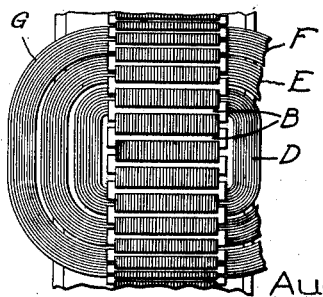

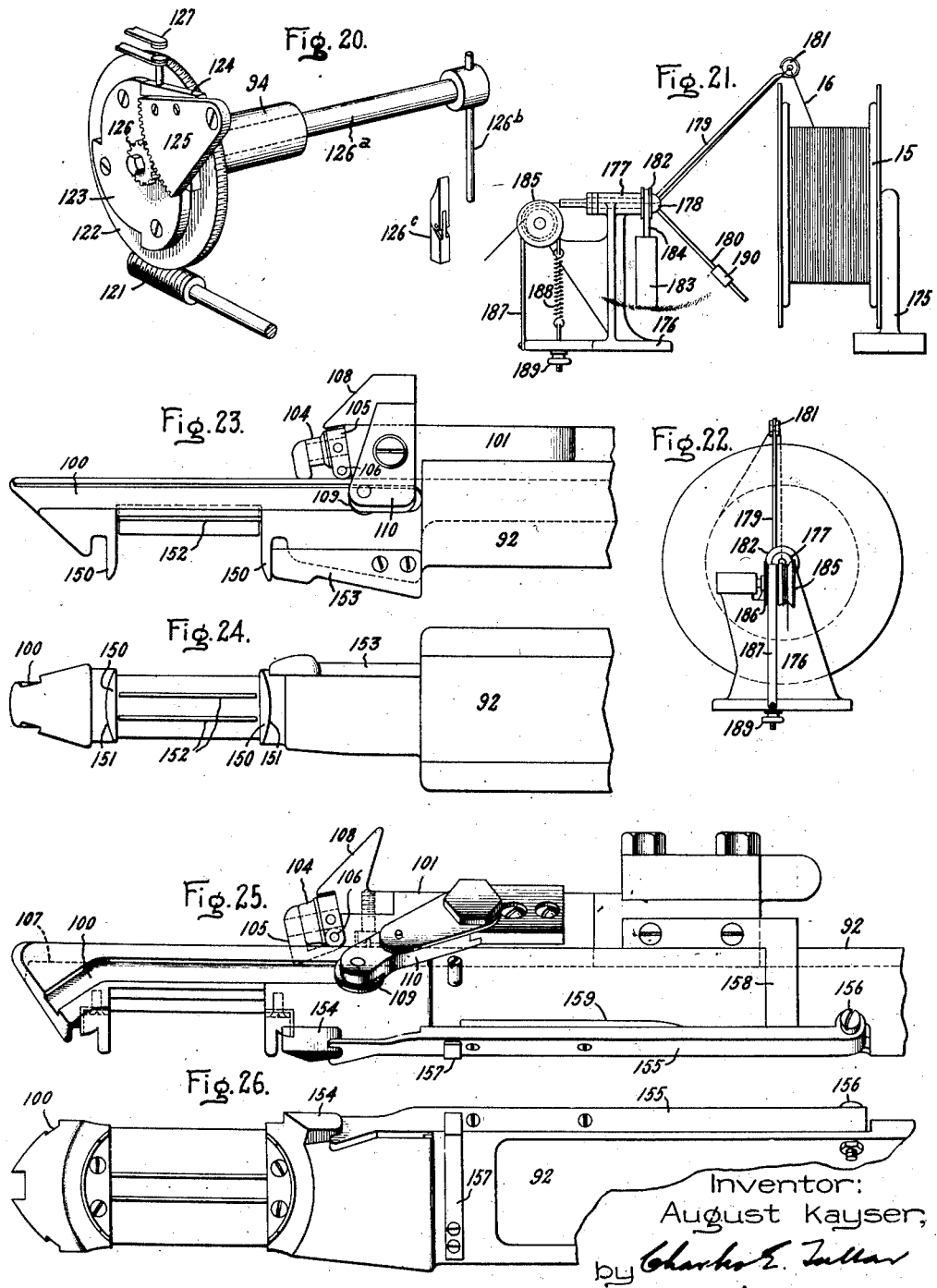

Patented Mar. 31, 1931

1,798,980

UNITED STATES PATENT OFFICE

AUGUST KAYSER, OF FORT WAYNE, INDIANA, ASSIGNOR TO GENERAL ELECTRIC COMPANY, A CORPORATION OF NEW YORK

WINDING MACHINE FOR DYNAMO-ELECTRIC MACHINES

Application filed August 16, 1929. Serial No. 386,430.

The present invention relates to machines for winding dynamo electric machines, and especially the stators thereof requiring what are known as polar windings. In such machines the stator has coil or wire receiving slots which are angularly spaced one from the other, each slot having a narrow mouth or wire receiving opening which opens into the bore of the stator and which is only slightly wider than the diameter of wire used in winding, the remaining portion of the slot being substantially enlarged to receive and retain a relatively large number of turns of wire. With a stator designed for such a winding the first coil to be applied spans a certain number of teeth or slots or pole arc and the succeeding coils each span a greater number of teeth or slots and a greater pole arc, the second and succeeding coil or coils completely enclosing the first in the plane thereof. After the first set of coils, say three for example, is wound in place, a second set is wound thereon and angularly displaced from the first, say by 90°, for a four pole stator, and then third and fourth sets. After four such sets of coils are wound and which are located in the bottoms of the slots, and are called the main sets, the operation is repeated and four other, or starting coils, are wound in place in the same manner on top of the first set so that the slots are completely filled.

The problems involved in making a machine for effectively and rapidly doing this work are many and difficult of solution. Chief among them may be mentioned that neither the wire or the insulation thereon shall be injured, that the tension on the wire must be uniformly maintained, that the wire must be accurately laid in the slots, that the number of turns in each slot must be exactly those required for the particular design of stator, that the machine must be capable of performing all of the various operations with very little attention on the part of the operator and must automatically stop when a predetermined number of turns forming a coil have been wound in place.

My invention has for its object the provision of an improved winding machine which will fulfill the many and exacting conditions and requirements involved in winding parts of dynamo electric machines and specifically those in internally winding a stator, and one which is capable of use in the hands of such operators as are available for this class of work.

For a consideration of what I believe to be novel and my invention, attention is directed to the accompanying description and the claims appended thereto.

In the attached drawings which are illustrative of my invention, Fig. 1 is a perspective view of the machine; Fig. 2 is a view partly in section of the head of the machine; Fig. 3 is a sectional view of the head taken on line 3—3 of Fig. 2; Fig. 4 is a longitudinal view of the machine with certain of the parts in section; Fig. 5 is a perspective view of the principal operating parts of the machine; Figs. 6 to 9 inclusive show different and successive positions of the parts during each winding operation; Fig. 10 is an end view of a stator after it is wound; and Fig. 11 is a view showing the arrangement of the coils for each pole of the stator; Figs. 12 and 13 are diagrams illustrating the piping and controlling valves whereby the movements of the turret are controlled; Fig. 14 is a perspective view of the arrangement for preventing the work holder from turning while permitting the wire to rotate; Fig. 15 is a front elevation of the parts shown in Fig. 14; Figs. 16, 17 and 18 are views of parts of the mechanism which actuate the winding arm; Fig. 19 is a modified form of the actuating mechanism for the winding arm; Fig. 20 is a perspective view of the means for controlling the circuit of the auxiliary motor which rotates the turret; Fig. 21 is a side view of the reel and of the friction means associated therewith; Fig. 22 is an end view of the same; Figs. 23 and 24 are respectively a side elevation and bottom plan view of an arbor and shuttle; Figs. 25 and 26 are similar views of larger arbors and shuttles having means for positively disengaging the wire at the proper time, and Fig. 27 is a detail view of the ratchet disk associated with the controller of the auxiliary or turret turning motor.

Referring first to Fig. 10, A indicates a stator for a dynamo electric machine made of laminated sheet steel and which is provided with a suitable number of coil receiving slots B, and teeth C between the slots, the walls of which at the mouth of each slot are very close together. In Fig. 11 is shown a polar arc or portion of the stator having an inner coil D, a second coil E, which surrounds the first, and a third coil F, which surrounds the second. The wire forming each coil has to be fed or inserted into the proper coil slots through the narrow openings between the teeth, be smoothly and evenly layed therein, and the end portions G must be curved as shown in Fig. 10 so as not to interfere with the rotor which occupies the bore of the stator and runs with a small clearance. In some cases it is customary to provide four instead of three coils in each set.

In the winding operation, the stator is held stationary. By suitable mechanism which will be described in detail later on, a rotating part or arm is caused to form or wind a turn or loop of wire of the proper length over an arbor and shuttle, which loop during the formation period is wholly outside of the stator. At the proper time the rotation of the arm is stopped and during this period of rest the shuttle is pushed into and through the bore of the stator and the loop is delivered by the shuttle into the slots. To do this it is evident that accuracy of movement and exact timing of the parts is essential, and especially because of the narrowness of the coil slots.

Referring to Fig. 1, 12 indicates a suitable frame or support which comprises a table and supporting legs. 13 indicates a housing for certain of the rotating parts, A the stator which is to be wound, and 14 the support or work holder therefor. On top of the housing is a reel 15 for the wire 16, 17 is an adjustable friction device which acts to retard the movement of the wire. 19 is a tension arm or device for the wire, and 20 is a winding arm which as it revolves in a circular path forms loops in the wire around a shuttle and arbor and which loops are subsequently laid in the coil slots. The machine is driven by an electric motor 21 through a belt or equivalent means, said motor being supported by a cross piece on the frame so that the whole is a self-contained unit. The machine is under the control of a pedal 22 which is conveniently located near a foot of the operator. The means which cooperate with the winding arm 20 to form the wire loops and later deliver them to the coil slots are mounted on the turret 24. As each magnetic pole of the stator in the present case has to have three coils, each of a different size, three shuttles and arbors are required. They are mounted on the turret in such manner that one after the other they can be turned and brought into operative position with respect to the stator A, as will appear later. Where more coils are required a greater number of arbors and shuttles is required.

Referring now to Fig. 4, there are on the left hand end of the bed or table two upright members 28 and 29 which have bearings in which a relatively large hollow shaft 30 is rotatably mounted. Inside of this shaft and concentric therewith is a stationary member 31, in the right hand end of which is formed a tapered socket to receive the tapered end 32 of the work holder 14 upon which the stator is mounted in a fixed position. The parts are united by a screw threaded bolt or other suitable means. The interior of the shaft 30 is bored out at the right hand end to receive one or more ball bearings 33 which preserve the concentric arrangement of the shaft and center member 31. The shaft has a small axially extending channel or passageway 34 through which the wire 16 moves in its passage from the reel to the stator. The member 31 is held against rotary movement by a floating key at the left hand end which will be described later in connection with Figs. 14 and 15, as well as the means for permitting the wire 16 to move with the hollow shaft without interference from the key.

The uprights 28 and 29 rise above the hollow shaft and carry ball bearings 35 for the driving shaft 36. Mounted on this shaft, beginning at the left hand end, is a brake disk 37 which cooperates with a suitable friction surface adjacent to it so that the machine can be quickly stopped at the end of each coil winding operation. In addition, there is a clutch 38 of suitable construction which is located inside of the pulley 39, is free to turn with respect to the shaft and is carried on ball bearings to reduce friction. The pulley is driven by a belt from the motor 21 shown in Fig. 1. Between the brake disk and the clutch is a ball thrust bearing 40 which cooperates with the fork that releases the clutch and applies the brake. Next to the pulley is a worm 41 which drives the worm wheel 42, and adjacent to it is a pinion 43, fastened on the shaft 36, and meshing with the teeth of gear 44 which is mounted on and drives the hollow shaft 30 and the parts moving therewith. The left hand side of the gear 44 has an enlarged hub in which is formed a cam groove 45. Located in the groove is a roller 46, shown in dotted lines, which is carried by the upper end of the vibrating lever 47. The lower end of the lever is connected by adjustable means 48 to the mechanism which moves the shuttle of the former into and out of the stator during the winding operations. For each complete loop or turn of the wire applied to the stator the lever moves the arbor once into and out of it, the operations being repeated, of course, for the successive turns of each coil.

The worm gear 42 is mounted on a cross-shaft 49, best shown in Fig. 5, which shaft carries a small gear 50 forming a part of a timing train. The small gear meshes with an intermediate gear 51 and the latter with a larger gear 52. The gear 52 is mounted on a second cross-shaft 53, on the front end of which is mounted a disk 54 which has as many axially extending stop pins 55 as there are coils in each set of windings, three being shown in the present instances. The clutch which has already been referred to is actuated by a fork 56 that is carried by a rock-shaft 57. On the end of the shaft is an arm 58a having a forked outer end and in which is secured by a suitable trunnion means, a vertical rod 58, the lower end of the rod being adjustably connected with the foot pedal 22 already mentioned in describing Fig. 1. Acting on the rod in a direction to raise it is a coiled compression spring 59, the lower end of which is seated on a suitable fixed abutment. The rod is held from rising, due to spring action, until a winding operation is completed by a slide 60 which moves in a guide 65. The slide and the guide have notches 66 which while the machine is operating are held out of register by the spring 67. When, however, a coil has been wound the train of timing gears 42, 50, 51 and 52 move the disk 54 and its pins 55 until one of them strikes the end of the slide 60 and pushes it backward. This action causes the notches 66 to be brought into register or alignment whereupon the spring 59 pushes the rod upward and in so doing causes the clutch fork 56 to open the clutch to release the pulley 39 from the driving shaft 36 and at the same time move the brake disk 37 to the left against a stationary surface to stop the machine.

Referred back to Fig. 4 there is mounted on the right hand upright 29 a vertical plate 68 through which the hollow shaft 30 freely extends and which is provided with a cam groove 69 on its right hand face, of the character best shown in Fig. 2. In front of the cam is a head 70 which is attached to and revolves with the hollow shaft 30. It is the cam 69 which imparts to the wire winding arm 20 and its support the peculiar motions which are necessary to carry out the looping of the wire 16 and permit the shuttle to move it into the stator A and release or discharge the loop into the proper coil receiving slots. The shuttles and their functions will be described in detail later on.

Referring more especially to Figs. 2, 3, 16, 17 and 18, the cam plate 68 is stationary and has a cam groove 69 of the configuration shown. Moving in the cam slot as the head 70 rotates is a roller 71 which is carried by the hook-shaped link 72, shown in dotted lines Fig. 2 and in section Fig. 3. The lower end of the link is connected by a pivot pin 73 to the floating ring 79 which carries the winding arm. The head 70 is of disk form and is provided with a radial slot 74 in which travels a sliding block 75 that is connected to the outer end of the link 72 by the same pivot 76 that connects the link to the cam roller 71.

Mounted on the head 70 and in angularly adjustable relation thereto is a support for the wire winding arm 20. It comprises, in the present illustration, a casting 77 which is secured by bolts 78 to the floating ring 79, a radial rod 80, a holder 81 in which the rod is adjustable in and out, and a split clamp 82 which receives and holds the winding arm in place.

The floating ring and its support are best shown in Fig. 3. On head 70 is an extension 83 which supports a vertically disposed plate 84 and on this plate and having a bearing in the bore thereof is the floating ring previously referred to and which carries the winding arm. The ring is made in two principal pieces which are united by screws, one of said pieces having a shoulder which acts as a bearing. The outer end of the stationary center member 31 has a flanged sleeve 61 which acts as a means to prevent axial movement of the member and which is provided in its flange with suitable securing means, such as screws 85.

As previously stated, the winding arm 20 has a rotary or circular motion about the central axis of the machine to form the wire loops which action or formation takes place wholly outside of the stator A. It is necessary, therefore, to move the loop after it is formed into the stator and then to deliver it to or deposit it in the coil slots. This means then that for some portion of each complete revoluion of the arm its angular movement must be temporarily stopped to permit the arbor to move first into and then out of the bore of the stator and this without shock of any kind. Since the hollow shaft 30 which drives the parts continuously, rotates at a uniform speed, it follows that to obtain the desired result the winding arm for one portion of each cycle of operation must be held stationary to permit the arbor to deposit the loop, and for the remaining portion it must move at a greater angular speed than the driving shaft until it catches up and the two thereafter move in synchronism. The means for obtaining these various movements are indicated in Fig. 3 and are obtained by the cam groove 69 and the link 72.

Bearing in mind that the cam plate 68 is stationary and that the head 70 rotates and also the winding arm 20 which is supported thereby, the action is as follows: Each cycle begins with the cam roller 71 in approximately the dotted line position 86. As the head is rotated clockwise the link and roller also move in the same direction because the roller is pivotally attached to the sliding block 75 carried by the head. As will be observed the cam groove gradually approaches the periphery until a portion of it is concentric with the axis. As a result of this the head and winding arm, due to the link 72 are caused, for a certain period of time or part of a revolution, to move at a relatively different and greater angular speed than the driving shaft 30. This differential action continues to approximately the position 87 where the cam groove is concentric wtih the periphery of the head 70 and also, of course, with the axis thereof. From position 87 to position 88 both the winding arm and head have the same angular speed and are, therefore, moving in synchronism. From position 88 to 89 the cam groove is struck on an arc which is concentric with the fulcrum 73 of the hook shaped link 72, and due to this arrangement the winding arm 20 is decelerated and stopped, the other parts continuing to rotate. It is during the period or portion of the cycle controlled by the cam from position 88 to the position 86 of the roller 71 that the shuttle and the wire loop which was formed during the preceding part of the cycle are moved into the stator A. As shown, the cam and link act to hold the winding arm stationary for approximately 42° of each revolution of the head 70 and for the greater part of the balance thereof cause the arm to move faster than the head until practically a complete revolution has been made when the speeds are equal. From approximately position 89 to 86 the wire loop is deposited in the proper slots and thereafter the shuttle is withdrawn or retracted preparatory to the beginning of the second cycle. From position 88 to 89 as already stated the cam groove is struck from the fulcrum 73 of the link as a center, and said groove rapidly moves toward the axis, considered clockwise. As a result of this the winding arm is momentarily stopped and then moved backward or in an anti-clockwise directon by a small amount while the head continues to move forward. This "kick back" as it may be termed, is a very valuable feature since it causes each wire loop to be deposited at the outer edges of a pair of the coil receiving slots instead of being permitted to pile up along the inner walls of the slots which would choke the mouth thereof before the required number of turns for each coil were in place.

Referring now to the mechanism which forms the loops of wire and deposits the same in the coil slots. The tail stock or support for the turret 24 is mounted in a fixed position on the table, and mounted therein, Fig. 5, is a slide 90 which is moved vertically in suitable guides by a piston located in the cylinder of motor 91 subject to air or other fluid under pressure. The purpose of this arrangement is to raise and lower the turret and with it the arbors and the shuttles so that the arbors or supports for the shuttles will clear the bore of the stator A both when being moved into and withdrawn from their operating positions.

At each magnetic pole of the stator in the present illustration has three coils which increase in width in a circumferential direction, three arbors are provided. Each arbor comprises an arm or body 92 which is fastened to a triangular shaped head 93, the latter being carried by a cross-shaft 94, Fig. 5, forming a part of the turret turning means. The shaft is carried by suitable bearings, one of which is located in the cross-head 95, and the latter is located in and guided by a rectangular frame 96 which comprises top, bottom and end members, said frame being moved vertically by the slide 90. The cross-head is connected to the piston rod 97, the piston of which is located in the cylinder of motor 98 and is moved back and forth by air or other fluid under pressure. The purpose of this arrangement is to successively move the arbors and their shuttles into and out of the bore of the stator A. The arbors are spaced 120° apart and are moved or rotated successively into operative position by a counterclockwise movement of the shaft 94 subject to the control of suitable timing means which will be described later on. Where the stator requires a different number of sets of coils, a corresponding number of arbors and shuttles will be provided.

Referring now to Figs. 4 to 9 more especially, the arbors and shuttles for forming the wire loops will be described. As these are alike except as to width or arc of the coils, a description of one will suffice. 92 indicates the main body of the arbor which is provided with a pair of longitudinally extending cam grooves 100, one on each side of the center, said grooves turning sharply downward at their outer ends. The top of the body acts as a guide for the shuttle 101, and the latter is moved by the vibrating lever 102 which is pivoted on the table of the machine and is itself moved by the lever 47 and connecting rod 47a, Fig. 4. On the upper end of the lever 102 is a pin 103 which enters the slot 103a, shown in dotted lines Figs. 6 to 9, and as the lever vibrates the shuttle is moved longitudinally into and out of the bore of the stator, it being understood that prior to each shuttle going into action the arbor body 92 has been moved to its operative position. The entering end of the shuttle, or one nearer the stator, has a roller 104 over which one end of the wire loop is formed. The roller turns on a short shaft which is carried by the member 105, the latter being pivotally secured to the main part of the shuttle 101 by a cross pin 106. The nose or forward end of the member travels in a groove 107, formed in the top of the arbor body 92 which holds the parts in the position shown until it is time to dump or discharge the loop of wire as shown in Fig. 9. Adjacent the roller 104 and above it is a horn 108 which as the winding arm 20 revolves about the shuttle and arbor guides the wire on to the roller. In order to lay the wire in the slots in the stator, both sides of the shuttle are provided with sheave pulleys 109 which are mounted on pivotally supported arms 110. On the same axis as each pulley is a small roller which travels in the cam slot 100 in the arbor. At the start of each cycle the shuttle, arms and pulleys are back as shown in Fig. 6 and then move toward and through the stator A as shown in Figs. 8 and 9, the latter figure clearly showing the wire 16 in the slot just before the backward or reactive movement of the shuttle begins. These figures also show how the loop which is formed outside of the stator is bent as the shuttle moves inwardly.

The action of the shuttle and arbor and their relation to the winding arm 20 is best shown in Figs. 6 to 9. In the outer end of the arm 20 is a pulley or other device 111 and over which the wire 16 passes. Considering first Fig. 6, one end of the wire is brought down from the pulley 111, over the pin 112 and attached to a temporary support 113. Now with the arbor and shuttle stationary and the winding arm and pulley rotating, the first part of the movement is to lay the wire on the inclined face of the horn 108 which guides it on to the roller 104. Continued rotation or circular movement of the arm brings it to the bottom position below the arbor as shown in Fig. 7, thus forming a U-shaped loop. When this is done, (and it is to be noted that the loop is entirely outside of the stator, and at this stage is in a practically vertical position or plane) the shuttle begins its inward movement as shown in Fig. 8. Continued movement of the shuttle due to the action of the vibrating lever 102, Fig. 5, moves the parts to the position shown in Fig. 9 where the wire is deposited in the proper slots. This discharge of the loop is due to the downward tilting action of the roller 104 due to the cam slot 100. Continued circular movement of the winding arm from its lowest position, Fig. 9, begins the second loop and in so doing forms the end part of a turn which is at the right side of the stator.

It will be seen from Fig. 9 that the wire loop at this stage of the cycle is considerably longer than is required to fill the axial slots in the stator and also form the end parts of the finished turn. In other words there is slack wire which must be taken up. This is done by the tension arm 19 which is interposed between the friction device 17 and the winding arm, Fig. 5. The tension arm is pivotally supported on a rod 19a carried by a fixed part of the frame and at its lower end has a sheave pulley over which the wire 16 passes. The arm is made of flat springy material and is purposely made light so as to have little inertia. The tension on the arm and therefore on the wire is obtained by the motor 19b to which air is admitted under pressure by the pipe 19c. The outer end of its piston rod is connected to the arm, and mounted on the rod is a coiled compression spring 19d the action of which can be varied by moving the adjustable stop 19e along the rod 19a. The spring serves to quickly move the piston rod into the cylinder when the air pressure is released and thus immediately remove the tension on the wire so that the operator has plenty of slack wire to begin a subsequent operation without having to pull a length of wire against the tension device 17 which calls for a considerable effort. As the tension arm 19 when in use always pulls on the wire it follows that as soon as the loop is discharged from the roller 104 the spring in the arm will take up the slack, the wire at this instant moving in the direction of the arrow, Fig. 9, which is counter to its normal movement. The slack is always taken up from the same side of the loop, that is to say, from the side nearest the winding arm. The under side of the arbor forms the outer end of each complete turn of wire in a coil. It begins to receive wire after a loop is formed and the roller 111 is down.

The parts are so timed or related that after the shuttle discharges the wire its reverse motion begins and is completed in time to receive the wire from the winding arm roller 111 when the latter has again reached approximately the position shown in Fig. 6. The forward and reverse movements of the shuttle are obtained, Figs. 4 and 5, by the cam groove 45, lever 47, connecting rod 47a, lever 102 and pin 103 therein which engages the walls of slot 103a in the shuttle. The actions above specified are repeated until the necessary number of turns of wire 16 have been laid in the slots when the machine is automatically stopped through the action of the stop pins 55, parts 59 and 60, Fig. 5, preparatory to moving the second and later the third arbor and their shuttles into position. The second and third arbors and their shuttles are of the same construction but are of successively increasing width so as to feed the wire into the proper slots, it being remembered that the coils are of increasing width, i. e., cover greater arcs of the stator and hence include more teeth between the sides of the finished coil.

To bring the successive arbors and shuttles into operative position, the following means are provided. At one side of the machine is a small auxiliary electric motor 115, Fig. 5, which has a pinion 116 on its rotor shaft which meshes with a gear 117, the latter being connected to the horizontal shaft 118 through a friction driving coupling 118a which normally connects the parts but which can slip if excessively loaded to prevent injury to the machine. In the shaft 118 is a universal coupling 119 which is made necessary by reason of the fact that the shaft at the motor end is fixed in bearings while the outer or other end has to move up and down in a vertical plane. There is also provided a telescoping arrangement 120 which permits of axial separation of the parts of the shaft. This is made necessary due to the fact that the turret has to move toward and away from the stator between certain winding operations. On the right hand end of the shaft is a worm 121 which meshes with a worm wheel 122 on the hollow cross-shaft 94. As before explained this shaft is supported in the cross-head 95 which has up and down movements and also movements toward and away from the stator A. In addition the shaft 94 has mounted on it a disk 123 which has three notches 120° apart, and an intermediate or fourth notch 123a to successively receive the pawl 124, Fig. 27. The three notches determine the operative positions of the arbors while the fourth or intermediate notch holds the arbors in an intermediate position to permit of manipulating the stator. Associated with the pawl for moving it at the proper time is a gear segment 125, Figs. 5 and 20, which in turn is moved by the gear wheel 126 on a small shaft 126a which is inside the hollow shaft 94. Located above the segment is a controller or switch 127 that is included in the circuit of the auxiliary motor 115. In the position shown the switch is open and also the circuit of the motor.

On the front end of the small internal shaft 126a is a handle 126b by means of which the arbors may be caused to rotate automatically to their respective positions, and by means of which their movements may be hand controlled. The automatic action will first be described: Mounted on the frame of the machine in front of the revolving head 93 of the turret, Fig. 4, is a stop 126c which rises vertically and comprises two parts that are united by a hinged joint, the upper part being normally held in a vertical position by a coiled extension spring, shown in dotted lines. As the head is moved upwardly and also to the right by means of the pistons of motors 91 and 98 as will appear later, the stop engages the handle 126b and moves it clockwise by a small amount. Prior to the completion of the upward movement the handle slips over the top of the stop. The engagement of the handle and stop turns the small internal shaft 126a in a direction to turn the segment 125 upward and this in turn closes the motor switch. The motor is thus automatically started and turns the head and the arbors to the next position as determined by the pawl 124. On the left hand bodily movement of the turret the handle strikes the stop 126c on the opposite side and because of the spring turns the upper part down which permits the handle to pass without affecting the switch and motor. If it is desired to rotate the turret and arbors when free of the stator, the handle 126b is moved by hand to close the motor circuit, and by so doing any arbor may be brought to a horizontal position preparatory to insertion into the stator. By proper manipulation of the motor controlling hand valve 129 while the handle 126b and the stop are out of engagement, (which means that the turret 93 is in its raised position) the same arbor may be caused to reciprocate into and out of the stator without any rotary motion thereof. This is important for it is sometimes necessary to perform some minor operations on the stator before the winding operation begins.

The mechanism for imparting movements to the turret 93 will next be described. As previously stated one end of the arbor is hooked over the left hand edge of the stator A as best shown in Figs. 6 to 9. This means that a simple to-and-fro movement will not suffice, that at some point in its stroke the arbor must be raised or moved radially with respect to the stator so that the hooked end thereof will clear the wall of the bore of the stator, the reverse operations taking place in removing the same. To raise and lower the turret a motor 91 having a cylinder and piston are provided, Figs. 4 and 5. Compressed air is admitted by the pipe 128 to the cylinder by the controller or hand valve 129 and the upward movement of the piston raises the turret and with it the cross-shaft 94 and parts associated therewith including the cylinder of motor 98. This action raises the arbor by an amount sufficient to clear the wall of the bore of the stator A. It also releases or removes the pin 103 on the vibrating lever 102 from the slot 103a in the shuttle. After the vertical movement is partially completed the horizontal movement of the turret begins. To carry out this with a single movement of the handle of the controlling valve 129, a valve 130 is carried by a suitable fixed support and is connected to the air supply by a branch pipe 131. Carried by the rectangular guide frame of the cross-head 95 is a valve lifter 132 which when the cross-head has been raised to about its upper limit raises the valve and admits air through the flexible pipe or tube 133 to the left hand end of the cylinder of motor 98, Figs. 4 and 5. This moves the turret and the parts associated therewith to the right and therefore moves the arbor out of the stator. The handle of valve 129 is then moved to the position to shut off air to the lower end of motor 91 and admit it to the outer end of motor 98, the other ends of the motors exhausting. The admission of air to the upper end of motor 91 causes the slide 90 to descend and position the arbor in the stator. Between the upward and subsequent outward or right hand movement of the turret the shaft 94 due to the action of handle 126b and the motor 115 has rotated 120° and swung the first arbor downward by an anticlockwise movement and the second arbor into axial alignment with the stator preparatory to its inward or left hand movement later on by the movement to the left of the piston of motor 98.

In order that the angular position of the arbor supporting head 93 may be accurately located or determined it is provided with three peripheral notches 135, as best shown in Fig. 4, which are spaced 120° apart. In the horizontal plane passing through the axis of the turret and carried by the left hand end member of the rectangular frame or other support is a stop-pin or projection 136 which successively enters the notches as the head 93 is moved to its operative position.

Since the shuttles slide on the arbors and since the latter rotate at times and at other times stand in radial positions it is necessary to hold the shuttles in their proper places when inactive. For this purpose there is provided a hook 137, Fig. 4, for each arbor which is pivotally mounted on the head and which when released drops and engages the upper part of the shuttle. This action takes place when the shuttle is in its retracted position and at or about the time it is moved from engagement with the pin 103 on the vibrating lever 102. In order that the latch may be caused to release the shuttle at the proper time a suitable lifter is provided. It comprises a vertical post 138, the top of which engages the flat under surface of the latch as it moves to the left. This is the position of the parts in Fig. 4.

As previously stated each magnetic pole of the stator A in the present illustration has three coils in the outer layer, the first to be wound, and three coils in the inner layer, the second to be wound. Each of the coils for a given pole span different arcs or numbers of teeth whereas the shuttle always moves back and forth in the same plane. Because of this it is necessary to angularly adjust the cam plate 68 which moves the winding arm by a small amount in order to vary the point or region of kick-off to insure the proper placing of the wires in the slots for the different shuttles and arbors. This is accomplished by means of the auxiliary motor 115, Fig. 5. Meshing with a worm on the shaft 118 which is driven by the motor is a worm wheel 145 which in turn rotates the cam 146, the latter having a cam groove in its periphery. In the groove is a roller which is attached to the rod 147 that in turn is connected to the cam plate 68 by the link 148. The cam groove and gearing are so timed or adjusted that the rod is moved longitudinally three times for each revolution of the cam 146, each time moving the cam plate to the proper position to slightly change the angular setting of the plate and consequently of that portion of the cam groove 69 between positions 88 and 86, Fig. 2, where the winding arm moves backward for a brief period.

In a stator for motors having multiple windings of the character described, it is important for some uses thereof, and notably when used in refrigerators where they are subjected to wide ranges of temperature and especially where the use of coil impregnating substances are not practical, to have spaces between the end turns of one coil and its neighbor, and between the inner coil and the laminations, to permit the wires to expand and contract with changes of temperature without injury. It is also important to provide means for guiding each loop after it is formed into the radially extending coil slots in the stator. In Fig. 23 is shown a form of arbor that is used in winding the first coil of a set and which differs somewhat from the type of arbor shown in Figs. 6 to 9 which are used on larger coils. 92 indicates the arbor body on which the shuttle 101 slides back and forth. The cam groove 100 is made straight and the nose of roll carrier 105 slides on the top thereof. The left hand end of the support is rounded so that when the shuttle reaches the end of its stroke within the stator, the tension on the wire loop pulls the end of the roll carrier downward and permits the wire to slip off into place in the slots. At the sides of the stator when the arbor is in its operative position are downwardly extending spacing devices 150 which are flat on the sides adjacent the stator and are slightly curved on their outer faces as indicated at 151 to form temporary supports and spacers for the wire loops. In order to accurately register the arbor with the coil receiving slots, the under side of the arbor is provided with one or two thin strips of metal 152 which enter a corresponding number of slots when lowered into position. In order to properly direct the wire loops into the coil slots on the right hand side of the stator, guides 153 are provided which as the shuttle moves into the stator temporarily hold the loop and later permit the wire thereof to slip off at the proper time and at the proper angles to enter the slots. The guides vary in shape and position somewhat for the different arbors but their function is the same in all cases. These spacing devices, such as 150, are provided for each of the arbors so that suitable spaces will be provided between the end turns of adjacent coils lying in the same plane. These spacing devices vary somewhat in size and shape for the different arbors and supports but their function is the same. For the larger loops the spacers are of course larger and are located at greater distances from the sides of the stator.

In some cases and particularly with the loops for the larger coils it is preferable to have means for positively holding the lower part of the loop in place on the arbor until it is completed and then to positively discharge it. One embodiment of this feature of my invention is illustrated in Figs. 25 and 26 wherein 154 indicates a hook having a rounded side and over which the wire is wound to form a loop and which temporarily and positively holds it in place. Cooperating with the hook and surrounding one end of it is a releasing device comprising a relatively long arm 155 which is secured at its rear end by pivot 156 to the arbor. Underneath the arm is a flat spring 157 which normally holds it in its raised position. Attached to the shuttle and moving in and out with it is an extension 158 which slides on top of the arm. In the path of the extension and mounted on the arm is a tapered piece 159 which forms a cam so that as the extension moves to the left it depresses the arm and causes its free end to disengage or push the wire from the hook 154 whereupon the tension device at the rear of the machine takes up the slack in loop and pulls the wire snugly into place.

In Fig. 12 is shown diagrammatically the piping and valves for the air motors which perform the various functions previously referred to. 19b indicates the motor which controls the tension on the arm 19a, 91 indicates the motor which raises and lowers the arbors and their supports, and 98 the motor which moves the arbors and their supports into and out of the stator. As shown the parts are in the loading position, that is to say, the arbors are in their retracted and elevated position. Compressed air is admitted by the pipe 159 and flows through the valve 129 to the under side of the piston in motor 91 and raises it. Air is also admitted to the pipe 131 to the valve 130. When the latter is opened by engaging the actuator 132 air is admitted to the cylinder of motor 98 and moves its piston to the right. The rear end of the cylinder is connected by pipe 160 to the exhaust pipe through the valve 129. 161 indicates a branch pipe which contains an unloading valve 162 not previously described. When the stem of the valve which moves with the cross-head 95 in a horizontal direction strikes the actuator 163 it opens the valve and air from the cylinders of motors 91 and 19b escapes through the pipe 160 and valve 129. It is the release of air pressure from the motor 19b which releases the pressure on the tension arm 19a and permits the operator to pull sufficient wire due to movement of the arm to start a new coil without having to pull against the friction or tension device associated with the reel.

In Fig. 13 are shown the same parts as described in connection with the previous figure but with the parts in the respective positions which they occupy when the machine is in operation.

In describing Fig. 4 reference was made to the fact that the central member 31 was stationary, that the hollow shaft 30 revolved around it, and that the wire 16 passed through a channel 33 in the shaft. In order to carry out these features of my improvement, the arrangement shown in Figs. 14 and 15 is provided. Fastened to the left hand end of the shaft is a plate 164 having a cam slot 165 in one face thereof. On the center member 31 is a head 31a and mounted in a slot therein to move transversely is a sliding key 166. On the key is a pin and roller 167 which travels in the cam slot. The key at its ends is arranged to alternately engage the walls of upper and lower slots 168 in a ring 169 which is held stationary in the frame of the machine. The parts are so arranged that when the wire is moving across the upper part of the key slot, the key is in the lower position as shown, and just before the wire reaches the lower position 180° from the first the cam groove and pin 167 raise the key into engagement with the walls of the upper slot 168 and permit the wire to pass. In other words, while the key holds the center member against rotation the key by its reciprocating movements permits the wire to freely pass first over one end and then the other. On an extension 30b of the center support and free to revolve thereon is a small wheel 30c, Fig. 5, containing a porcelain bushing 30d through which the wire 16 passes, said wheel serving as a means to guide the wire into the revolving hollow shaft.

In Fig. 19 is illustrated a modified form of the means for imparting the necessary and peculiar movements to the winding arm. For the hook-shaped link 72 is substituted a rack 170 and a gear 173. The rack has a roller 71 which travels in the cam groove 69 to reciprocate it and also a sliding block 75 which moves radially in the slot 74 in the head 70 as it rotates. In these latter particulars the construction is the same as described in connection with Figs. 2 and 3. The rack is guided in its movements by the roller 174 which also maintains the teeth of the rack and gear in proper engagement. This arrangement while operating in the same manner as the link has a certain and material advantage over it. It will be observed from Fig. 2 that when the sliding block 75 is at or about the inner end of its stroke a straight line connecting the pivots 73 and 76 will pass quite close to the axis of the rotating parts so that the leverage is small whereas when the block 75 is at or about the outer end of its stroke the pivot 73 is moved to the left and the leverage exerted on the support of the winding arm is much greater. To state the matter another way, the link and connected parts exert a variable force on the support of the winding arm at different points in its circular movement. In the modified construction the effective leverage is always the same because the distance from the axis to the pitch line of the rack teeth remains constant. As the movements imparted to the winding arm by the rack and pinion are the same as those described in connection with Figs. 2 and 3 further description is unnecessary.

For the successful and continuous operation of a machine of this character, much depends upon the way the wire is taken from the reel or spool. If the wire does not move smoothly and evenly therefrom it results in temporary shut-downs which are not only annoying to the operator but increase the cost of the winding operations. I have found that the best results are obtained when the reel is held stationary and the wire is removed therefrom by a rotary means. Referring to Figs. 21 and 22, 15 indicates the reel and 175 the support therefor and on which it is held stationary. 176 indicates a bracket which is suitably mounted on the machine and has a bearing at its upper end for the hollow shaft 177 shown in dotted lines. On one end of the shaft are two projections 178 to which are attached arms 179 and 180. In the outer end of arm 179 is mounted a porcelain bushing 181 through which the wire 16 passes and thence through the center of hollow shaft 177. As will be seen from Fig. 22 the shaft 177 is in axial alignment with the axis of the reel and that the wire is removed from the reel at about a forty-five degree angle. Due to the pull on the wire by the winding arm etc., the arm 179 revolves backward and, so to speak, peels the wire off of the reel in so doing. By arranging the axis of the reel horizontal, as distinguished from vertical, there is no danger of one turn getting loose and fouling another as the wire is removed. In order to counter balance the arm 179, the second arm 180 is provided and mounted therein in an adjustable counter balance 190. After a substantial amount of wire has been removed from the reel and the diameter of the remainder decreased the revolving arm has a tendency to rotate too freely. To correct this, the shaft 177 has a friction pulley 182 mounted on one end thereof and a suitable weight 183 suspended therein by a strap 184. This arrangement is such that the strap can be slipped over the bearing bracket when not in use which may be approximately half of the time.

It is necessary in a machine of this kind to provide a friction device to impart the necessary tension to the wire. For this purpose a drum or capstan 185 is provided having a grooved periphery, the faces of which are beveled or inclinde toward each other. Several turns of wire are wrapped around the capstan, the wire being fed thereto from one side and removed from the other. On the same spindle which carries the capstan is a friction pulley 186 over a part of which is wrapped a strip of leather 187. One end of the strap is fastened to the bracket and to the other end is attached a coiled extension spring 188. The tension of the spring is adjusted by the nut 189. For different climatic conditions, it has been found necessary at times to make slight adjustments of the spring.

In employing my improved machines, especially for large production, it is preferable to use one machine for winding the main coils and a second machine for winding the starting coils which are made of somewhat small diameter wire. Because the wire is smaller, the second machine can be operated at a somewhat higher speed. The use of a second machine obviates the necessity of making changes which would be necessary if one machine were used for both main and starting coils or windings. As a result of this a lesser number of starting coil winding machines is required than of main coil winding machines for a given output of stators.

I believe it to be broadly new with me in a winding machine to wholly form loops of wire outside of the stator and to thereafter move the loops into the stator and deposit the same. More specifically I believe it to be broadly new with me in such a machine, to provide a rotary wire winding arm which has a circular path of movement to form loops with a shuttle which moves the successive loops into and discharges or deposits the same in the proper places within the stator together with means for compounding the rotary movements of the arm with the reciprocating movements of the shuttle to permit of this. A rotary winding arm has the advantage of smoothly and evenly winding the wire into loops and this without shock or injury to the wire or to its insulation. By the use of the arbors and their shuttles the loops are accurately directed into the stator slots. This is of great importance because the mouths of the slots are not very smooth, being formed in a laminated structure, and are only very slightly wider than the wire itself.

Another and important feature of my improved machine resides in the fact that the work and the work holder are both held stationary. This is an outstanding advantage because a stator is very heavy as compared to the wire with which it is to be wound and to oscillate the stator back and forth between the necessary predetermined limits in a very brief interval of time to permit the wire to be laid in the slots would require the expenditure of very considerable power to start it into motion and would also result in a very substantial shock when the stator is brought to a sudden stop at the limits of its movements. It is the shocks which are so detrimental in the operation of any machine, and especially in a high speed winding machine, as in the present instance.

With my improved machine it has been made possible to wind stators of a character which heretofore have always been wound by hand, and very much faster as well. For example, a good machine operative and on a regular production basis, can wind ten times more stators in a given time than can a good hand winding operative, and can wind them better and more uniformly. This, of course, results in a substantial decrease in manufacturing cost and is particularly impressive where the production of stators runs into the thousands.

What I claim as new and desire to secure by Letters Patent of the United States is:

1. In a machine for internally winding a stator, the combination of a holder for the stator, means which wholly forms a loop of wire outside the stator, and a means which moves the loop into position within the stator, releases the loop and is then retracted.

2. In a machine for internally winding a stator, the combination of a holder for the stator, a rotary means which wholly forms a loop of wire outside of the stator, a reciprocating means which carries the loop into the stator and discharges it, and a motive power agent for actuating the reciprocating means.

3. In a machine for internally winding a stator, the combination of a stationary holder for the stator, a rotary means located at one side of the stator for forming successive loops of wire, a second means cooperating with the first to form loops and for carrying them one after the other into the bore of the stator and there depositing them, and a motive power agent which moves the loop carrying means into and out of the stator once for every revolution of the loop forming means.

4. In a machine for internally winding a stator, the combination of a stationary holder for the stator, a means which travels in a circular path to form wire loops, a means for varying the angular speed of the loop forming means during each complete revolution thereof, a means which moves each loop after it is formed into and deposits it in the stator, and an actuator for the last named means which moves it into and out of the stator when the angular speed of the loop forming means is at its minimum.

5. In a machine for internally winding a stator, the combination of a holder for the stator, a winding arm which travels in a circular path, a constantly rotating driving shaft, means for transmitting motion from the shaft to the arm which for each circular movement of the arm holds it stationary for a predetermined portion of each revolution of the shaft and then moves it at a greater angular speed than that of the shaft until the two are rotating in synchronism, an arbor means over which the arm forms loops of wire, and a means for moving the loop into the stator and depositing it during that portion of the cycle that the movement of the arm is at a minimum.

6. In a machine of the character described, the combination of a work holder, a former, a means for winding wire over the former to make a loop, a means for moving the loop axially with respect to the work and deposit the same in the proper position on the work and then to retract, and a tension device which pulls the wire of the loop taut after it has been deposited.

7. In a machine of the character described, the combination of a work holder, a former, a rotary means for winding wire over the former to form a succession of loops, a means for reciprocating the former between the formation of each loop and causing it to move each loop to a position where it covers the work and then deposit the same thereon, and a device for exerting tension on the wire, both before and after it is deposited on the work.

8. In a machine of the character described, the combination of a work holder, a former comprising an arbor and shuttle, a continuously rotating means for successively making loops of wire around the former, a reciprocating means for moving the shuttle to deposit the loops on the work, and a device for exerting tension on the successive loops to pull them into place after they have been deposited.

9. In a machine of the character described, the combination of a stationary work holder, a former, a rotary wire carrying arm which winds wire around the former to form a succession of loops, a means causing the arm to have a brief period of rest during each revolution and subsequent to the formation of the loop, and a means acting during said period of rest to move the former over the work and permit it to deposit the loop.

10. In a machine for internally winding slotted stators, the combination of a holder to support the stator in a fixed position, a reciprocating former which moves into and out of the bore of the stator, a winding arm, means for moving the arm in a circular path around the stator and former at varying angular speeds to wind wire on the former when it is wholly outside of the stator to form a loop, a means which moves the former and loop into the bore of the stator and deposits the same in the stator slots and then to retract the former preparatory to a repetition of the cycle, and a tension device which completes each turn of wire about the teeth of the stator.

11. In a machine of the character described, the combination of a work holder, an arbor and shuttle, a continuously rotating means for forming loops of wire around the shuttle, a means associated with the shuttle to deposit the loops thus formed on the work, a means for varying the angular speed of the rotary means during each revolution to permit the depositing means to deliver the successive loops, and a tension means for taking up the slack in the wire loops.

12. In a machine of the character described, the combination of a work holder, a former, a rotating means for forming a succession of loops around the former, a reciprocating means for successively depositing the loops on the work, and a means for rendering the rotating loop forming means ineffective for a limited portion of each revolution to permit the reciprocating means to deposit a loop and retract.

13. In a machine for internally winding a slotted element, the combination of a holder for the element, a shuttle, a winding arm, rotating means for moving the arm in a cylindrical path to form loops of wire around the shuttle, a means for retarding the arm for a brief period in each complete rotation thereof and for later accelerating it to an angular speed corresponding to that of the rotating means, and a means for moving the shuttle into and out of the said slotted element during the period of retardation of the winding arm.

14. In a machine for winding slotted elements, the combination of a holder for the element, a reciprocating shuttle, a winding arm which travels in a circular path about the shuttle to form loops of wire of greater length than the slots, a driving shaft for the arm which rotates at a uniform angular speed, means interposed between the arm and shaft for varying the angular speed relation of the two, a means for reciprocating the shuttle during the period in each revolution that the difference in the angular speed of the arm and shaft is at a maximum, and a tension device for taking up the slack in the wire each time that a loop is discharged by the shuttle.

15. In a machine for winding slotted elements, the combination of a holder for the element, a shuttle which has a normal position at one side of the element, an arm for winding wire loops about the shuttle when in said position which loops are longer than the slots in the element, a means for moving the shuttle over a portion of the element to deliver the loops of wire to it, and a tension device which takes up the slack in the wire after it is discharged by the shuttle.

16. In a machine of the character described, the combination of a work holder, a longitudinally extending arbor, a shuttle comprising central and side members, said shuttle being mounted to reciprocate on the arbor, means associated with the members to cause them to receive a wire and form a loop when in one position and to discharge the loop when moved to another position, a means for winding wire about the members to form loops, a rotary shaft for turning the winding means, and a means for imparting reciprocating movements to the shuttle.

17. In a machine of the character described, the combination of a work holder, a shuttle means having a position at one side of the work, a device for winding wire about the means to form a loop which is longer than a finished coil, reciprocating means which move the shuttle into the work to permit it to discharge the loop and later to withdraw the same, and a device which acts on the wire during the formation of the loop to impart suitable tension thereto and which after the loop is discharged by the shuttle reduces the size of the loop by taking up the slack.

18. In a machine of the character described, the combination of a stationary work holder, a rotary shaft, a winding arm which travels in a circular path and is driven by the shaft, a connecting means between the shaft and arm which varies the angular speed relation of the two during each complete circular movement of the arm, a shuttle over which the arm winds a wire to form a loop, a support for the shuttle, and a means for moving the shuttle longitudinally into and out of the work during the period when the difference in angular speed of the shaft and arm is at a maximum to permit the shuttle to discharge the loop.

19. In a machine of the character described, the combination of a stationary work holder, a rotary shaft, a winding arm driven by the shaft which moves in a circular path, shuttles over which wire is wound by the arm to form loops, arbors for the shuttles, a turret for the arbors, a means for reciprocating the shuttles on their arbors and cause them to deliver the loops to the work after they are formed, a means for raising and lowering the turret, and other means for moving the turret sidewise to move the shuttles longitudinally into and out of the work.

20. In a machine of the character described, the combination of a stationary work holder, a rotary shaft, a winding arm driven by the shaft which moves in a circular path, shuttles of different size over which wire is wound by the arm to form loops, an arbor for each of the shuttles, a turret on which the arbor supports are mounted in spaced angular relation, a means common to the shuttles for reciprocating them one at a time to deliver the wire loops to the work, a means for lowering and raising the turret to move the arbors and shuttles into and out of operative relation with respect to the work, means for moving the arbors outside of the boundaries of the work, and means for successively moving the arbors into axial alignment with the work.

21. In a machine of the character described, the combination of a stationary work holder, a support therefor, a driving shaft, a winding arm, a rotary face plate for supporting the arm, a cam plate associated with the face plate, and a power transmitting means, one end of which is guided by the cam plate and rotates with the face plate, the other end moving the winding arm, said means and cam imparting a circular movement to the winding arm, and also varying the relative angular relation of the arm and face plate during each revolution.

22. In a machine of the character described, the combination of a rotary shaft, a face plate which is rotated thereby, a winding arm which is supported by the plate to turn independently thereof, a stationary plate having a cam surface, a power transmitting means, one end of which moves the winding arm, the other end being acted upon by the cam, and a means for causing the end of the transmitting means acted upon by the cam to rotate with the face plate.

23. In a machine of the character described, the combination of a rotary shaft, a face plate which is rotated thereby, a winding arm which moves in a circular path, a cam plate adjacent to the face plate, a power transmitting means having one end connected to the winding arm and the other end engaging the cam and being rotated and guided in its movement by the face plate, said cam and means being so related and arranged as to cause the winding arm to vary its angular speed with respect to the face plate during each complete revolution of the latter.

24. In a machine of the character described, a combination of a work holder, a shuttle, a winding arm which has a circular movement and as it rotates forms a succession of wire loops over the shuttle, a means acting after each loop is formed for moving it and the shuttle into the work and for subsequently retracting the shuttle, a means for causing the shuttle to release the loop at the end of its inward movement, and a device which imposes a tension on the wire during the formation of each loop and which takes up the slack and pulls the wire into place after the loop is discharged by the shuttle.

25. In a machine of the character described, the combination of a stationary work holder, a winding arm which revolves in a circular path, a shuttle which receives wire from the arm as it revolves and forms a loop for each revolution of the arm, a shaft for rotating the arm, means for varying the angular speed relation of the shaft and arm during each revolution thereof, a vibrating lever for moving the shuttle over the work and retracting it once for each revolution of the arm, a means for causing the shuttle to discharge the loop at the inner end of its stroke, and a means for vibrating the lever.

26. In a machine of the character described, the combination of a stationary work holder, a revolving winding arm, a shuttle over which the arm winds wire to form loops, a means for reciprocating the shuttle with respect to the work and causing it to discharge the loop at the inner end of its stroke, a reel of wire, and a tension device acting on the wire between the reel and the arm which comprises a movable member and an air pressure means acting on the member in opposition to the pull exerted by the wire.

27. In a machine of the character described, the combination of a work holder, a shuttle, a winding arm which forms loops of wire about the shuttle, an arbor for the shuttle, a turret which carries the arbor, a motor which moves the arbor and shuttle radially with respect to the work, a second motor for moving the arbor and shuttle longitudinally to remove them from inside of the work, and controlling means for the motors.

28. In a machine of the character described, the combination of a work holder, a shuttle, a winding arm which forms loops of wire about the shuttle, an arbor for the shuttle, a turret which carries the arbor, a motor for moving the turret and arbor radially with respect to the work, a second motor for moving the turret toward and away from the work, a controller for the first motor, and a separate controller for the second motor which is automatically actuated in response to movements of the turret.

29. In a machine of the character described, the combination of a work holder, shuttles, a rotating winding arm which forms loops of wire over the shuttles as they are successively moved into operative position, arbors which carry the shuttles, a turret for the arbors, a shaft carried thereby which moves the arbors step-by-step, means for moving the turret up and down and also side-wise, a motor for turning the shaft, and a device to definitely stop the shaft at predetermined angular positions of the arbors.

30. In a machine of the character described, the combination of a work holder, shuttles, a rotating winding arm which forms loops of wire over the shuttles as they are successively moved into operative position, arbors which carry the shuttles, a turret for the arbors, a shaft carried thereby which moves the arbors step-by-step in a circular path, means for moving the turret up and down and also side-wise, an auxiliary motor, speed reducing gearing between the motor and shaft, a device to definitely stop the motor at predetermined angular position, and a controller for the motor which is actuated by the movements of the shaft.

31. In a machine of the character described, the combination of a work holder, shuttles, a rotating winding arm which forms loops of wire about each shuttle in succession as it rotates, arbors for the shuttles, a turret for moving the arbors and the shuttles successively into and out of operative position by a longitudinal movement, means for turning the turret when the arbors and shuttles are removed from the work, and means for insuring a definite angular position for each of the arbors and its shuttle when the latter are moved into operative relation within the work.

32. In a machine of the character described, the combination of a stationary work holder, a support therefor, a rotating winding arm, a hollow shaft which is concentric with the axis of the arm and that of its support, a driving motor, a shaft rotated thereby, gearing driven by the motor driven shaft for rotating the hollow shaft, a loose pulley on the motor driven shaft, a clutch for connecting the pulley to the shaft, a brake on the shaft, a clutch actuating lever, a timing gear train driven by second mentioned shaft, a disk driven by the gear train, means on the disk which acts as a stop, and means actuated by the stop to release the clutch and apply the brake.

33. In a machine of the character described, the combination of a turret, a shaft for rotating it step-by-step, arbors carried by the head in spaced angular relation, a shuttle mounted on each of the arbors for longitudinal sliding movement thereon, latches which prevent movements of the shuttle on their supports while inactive, and means for releasing each latch prior to the shuttle moving to its operative position.

34. In a machine of the character described, the combination of angularly spaced arbors, a shaft for rotating the arbors step-by-step, a disk moved by the shaft having notches therein, a pawl cooperating therewith to limit each successive angular movement of the shaft, a motor for rotating the shaft, and a controller for the motor which is actuated by the pawl.

35. In a machine of the character described, the combination of angularly spaced arbors, a shaft for rotating them step-by-step, a motor, speed reducing gearing between the motor and shaft, a disk mounted on the shaft which has as many notches as there are operative positions of the arbors and also a notch intermediate two of the others to hold the arbors in an inoperative position, a pawl arranged to enter the notches successively, a controller for the motor, and a means for raising the pawl and operating the controller each time it is desired to rotate the arbors.

36. In a machine of the character described, the combination of an arbor, a support therefor, a motor for rotating the support and arbor step-by-step, a means for stopping the support and arbor at predetermined angular positions, a controller, an actuator for moving the controller to close the circuit of the motor, and a device actuated by said means to move the controller to open the circuit of the motor each time the support and arbor have moved one step.

37. In a machine of the character described, the combination of angularly spaced arbors, a head for supporting them, a hollow shaft for rotating the head, a notched disk and pawl for determining the angular positions of the shaft and head, a small shaft located inside of the hollow shaft, a pivotally supported member which moves with the pawl and is actuated by the small shaft, a driving motor for the hollow shaft, and a controller therefor which is moved to its open and closed positions by the member.

38. In a machine of the character described, the combination of a stationary work holder, a rotary winding arm, a hollow shaft in which a part of the holder is located, said shaft having a longitudinal channel through which wire is fed to the arm, a head connected to the work holder which has a sliding key, a stationary member which surrounds the head and has a pair of radially extending opposed slots, and a means for moving the key from one slot to the other to permit the wire to rotate with the hollow shaft while holding the work holder stationary.

39. In a machine of the character described, the combination of a hollow rotary shaft which contains a longitudinal channel through which a wire moves in an axial direction, a stationary member inside of the shaft, and a means for holding the member stationary which comprises a slotted head that is fastened to one end of the member, a reciprocating key in the slot, a stationary ring which surrounds the head and has a pair of diametrically opposed slots, and cam means rotated by the hollow shaft which move the key longitudinally from one slot to the other to move it out of the path of the wire passing through the hollow shaft.

40. In a winding machine of the character described, an arbor which comprises a main body portion that is adapted to fit over the work, a member mounted to slide on the body and which is adapted to receive a loop of wire, a device carried by the member which discharges said loop at the inner end of the stroke of the member, cam means for actuating the device, coil spacers mounted on the under side of the body, which receive and hold the wire discharged by the device, and means which guide the wire as it leaves the body due to a movement of the member.

41. In a winding machine of the character described, an arbor which comprises a main body portion that is adapted to be placed over the work, a reciprocating member mounted to slide on the body and over which a loop of wire is formed, a means on the body to positively hold the wire while the loop is being formed, and a means for causing the holding means to release the wire after the member starts its movement.

42. In a winding machine of the character described, an arbor, a shuttle arranged to slide on the arbor and over which wire is wound to form a loop, a device on the arbor which holds the wire during the formation of the loop, a means for moving the shuttle to cause it to discharge the loop, and a means for releasing the wire from the device after the shuttle starts its wire discharging movement.

43. In a machine for winding slotted elements, the combination of an arbor, a shuttle mounted to slide on the arbor and over which wire is wound to form a loop, a means on the arbor which extends into a slot in the element to align the arbor with the other slots in the element, and a means for imparting reciprocating movements to the shuttle.

44. In a machine for internally winding slotted stators, the combination of an arbor, a shuttle mounted for reciprocating movement thereon, a means for aligning the arbor with the slots in the stator, a means for winding wire around the shuttle to form loops, a power actuated device for moving the shuttle, spacing means on the arbor which receive the end portions of the loops, and a guide on the side of the arbor which directs the loops into the slots as the shuttle moves into the stator.

45. In a machine of the character described, the combination of a rotary shaft, a winding arm, a shuttle over which the arm winds wire to form loops, and a means for transmitting motion from the shaft to the arm which comprises a rack which is reciprocated by the shaft and a gear which is actuated by the rack and transmits motion to the winding arm.

46. In a machine of the character described, the combination of a rotary shaft, a rotary winding arm, a stationary cam, a revolving head, a rack which moves the arm in a circular path, is rotated by the head and which during its rotary motion is moved longitudinally by the cam, said cam being shaped to vary the relative angular speeds of the shaft and winding arm during each revolution.

47. In a machine of the character described, the combination of a shaft which rotates at a uniform speed, a winding arm, a head driven by the shaft, a rack which is rotated by the head in a plane parallel thereto, a gear which meshes with the rack and moves the arm in a circular path about the axis of the head, and a cam plate which moves the rack longitudinally in such manner that for each revolution of the head the angular movements of the winding arm with respect thereto are first accelerated, then decelerated, stopped and finally moved backward by a small amount.

48. In a machine for internally winding slotted stators, the combination of a holder for securing the stator in a fixed position, a revolving loop forming means, a reciprocating loop carrying and depositing means, and a means for compounding the rotary and reciprocating movements of said means to form coils in the stator.

49. In a machine of the character described, the combination of a work holder, a rotary wire winding arm, a turret, arbors and reciprocating shuttles supported by the turret, motor means for elevating the turret and also withdrawing the arbors and shuttles from the work, a motor for rotating the turret when the arbors are withdrawn, a tension device for the wire, and a means responsive to movements of the turret for temporarily rendering the tension device inoperative when the arbors are withdrawn from the work.

50. In a machine of the character described, the combination of a stationary wire carrying reel, a means for supporting the reel in a horizontal position, a counter balanced arm which unwinds the wire from the reel and is itself rotated by the movement of the wire, a pivotal support for the arm, a rotary capstan around which the wire is wrapped, and a friction device which retards the rotation of the capstan.

51. In a machine of the character described, the combination of a stationary wire carrying reel, a means for supporting the reel, an arm which unwinds the wire from the reel and is itself rotated by the movement of the wire, a pivotal support for the arm, a rotary capstan around which the wire is wrapped, a friction device which retards the rotation of the capstan, a winding arm which receives wire from the capstan, a tension arm which acts on the wire between the capstan and arm, a piston and cylinder which normally exert pressure on the tension arm, and a valve for releasing the fluid pressure within the cylinder when it is desired to obtain a length of wire without turning the capstan.

52. In a machine of the character described, the combination of a work holder, a turret, an arbor and a shuttle carried by the turret, a motor for elevating the turret with respect to the work holder, a hand actuated controller therefor, a second motor for moving the turret away from the work holder after it has been elevated, and a controller for the second motor which is actuated by the upward movement of the turret.

53. In a machine of the character described, the combination of a work holder, a turret, an arbor and shuttle carried by the turret, a motor for elevating the turret, a second motor for moving the turret away from the work holder, a winding arm, a reel for supplying wire to the arm, a tension device which acts on the wire between the reel and winding arm, a fluid pressure motor which acts on the device to maintain tension on the wire, and a valve which is actuated by the turret when it moves away from the work holder to release the fluid pressure within the cylinder.

54. In a machine for internally winding stators, the combination of a work holder, an arbor which extends into the stator, the sides of which are aligned with a pair of slots in the stator, a shuttle mounted to reciprocate on the arbor, a winding arm which winds wire about the arbor and shuttle to form a loop and which has a circular movement, a means for varying the angular velocity of the arm during each revolution, and a means for moving the shuttle into the work to deposit the loop and retract it while the winding arm is practically stationary.

In witness whereof, I have hereunto set my hand this 14th day of August, 1929.

AUGUST KAYSER.